United States Patent [19]

Heylands

[11] 3,801,035

[45] Apr. 2, 1974

[54] ENDLESS TAPE CASSETTE

[76] Inventor: Wilhelmus Franciscus Aloysius Heylands, Emmasingel, Eindhoven, Netherlands

[22] Filed: Aug. 24, 1970

[21] Appl. No.: 66,291

[30] Foreign Application Priority Data

Aug. 23, 1969 Japan .............................. 44-79643

[52] U.S. Cl. ........................................ 242/55.19 A
[51] Int. Cl. ........................................ B65h 17/48
[58] Field of Search.... 242/55.19 A, 55.19 R, 55.01

[56] References Cited

UNITED STATES PATENTS

| | | | |
|---|---|---|---|
| 3,559,908 | 2/1971 | Esashi | 242/55.19 A |
| 3,401,397 | 9/1968 | Blakistone et al. | 242/55.19 A X |
| 3,490,671 | 1/1970 | Hladky | 242/55.19 R X |
| 3,481,551 | 12/1969 | Steelman | 242/55.19 A |

FOREIGN PATENTS OR APPLICATIONS

| | | | |
|---|---|---|---|
| 1,012,109 | 4/1952 | France | 242/55.19 R |

*Primary Examiner*—Billy S. Taylor
*Attorney, Agent, or Firm*—Frank R. Trifari

[57] ABSTRACT

A flat box-shaped cassette having front wall apertures cooperating with the drive capstan and recording and reproducing heads of a conventional recording and playback machine supports an endless tape retained in a genrrally rectangular coil by four flangeless spools so that tape can pass from the inner coil con-volution via suitable guides and recording and playback heads to return as the outer coil convolution.

1 Claim, 2 Drawing Figures

INVENTOR.
WILHELMUS F.A. HEYLANDS
BY
AGENT

ENDLESS TAPE CASSETTE

The invention relates to a cassette which contains a recording tape for recording and/or reproducing magnetic recordings. Such a cassette is in the form of an elongate flat box having a bottom, a cover and side walls, the bottom and the cover having openings which are aligned with one another in pairs and which allow the cassette to be placed onto two winding spindles and a driving shaft provided in a recording and/or playback apparatus. One of the longer side walls of the cassette is formed with openings past which the recording tape is conveyed by two guide rollers and through which magnetic heads and a pressure roller provided in the apparatus can be introduced into the cassette. The recording tape is in the form of an endless coil and is pulled from the interior of the coil along a diagonal path in the cassette to one of the said guide rollers. It is fed forward to the other guide roller and then is returned to the exterior of the coil. The tape during its travel along the diagonal path is initially twisted through 90° and in the twisted condition moves past the windings of the coil, after which it is twisted in the opposite direction and reaches the first-mentioned guide roller with its original orientation.

French patent specification No. 1,529,177 describes such a cassette. In this known cassette the tape coil is in the form of a roll of tape which is wound on a freely rotatable core, the tape being unwound from the interior of the roll along the circumference of the core and being wound onto the exterior of the roll. This produces relative shifting of the windings of the roll with a resulting relative friction which will be greater in proportion as the roll contains more windings. In view of a desired play-time of the cassette the roll must comprise a comparatively large number of windings, which gives rise to a relative friction of the windings such that the tape may be damaged and a smooth tape transport is prevented.

It is an object of the invention to obviate the said disadvantages, and a cassette according to the invention is characterized in that the coil of tape is arranged around four flangeless supporting rollers which are disposed so as to shape the coil in the form of an elongate rectangle the longer and shorter sides of which are parallel to the longer and shorter sides respectively of the cassette, the supporting rollers being mounted for free rotation on studs secured in the bottom of the cassette.

The device according to the invention provides the advantage that a maximum supply of tape can be accommodated in the cassette, resulting in a maximum play-time, with a comparatively small number of windings, resulting in little friction being produced.

Figure 1:
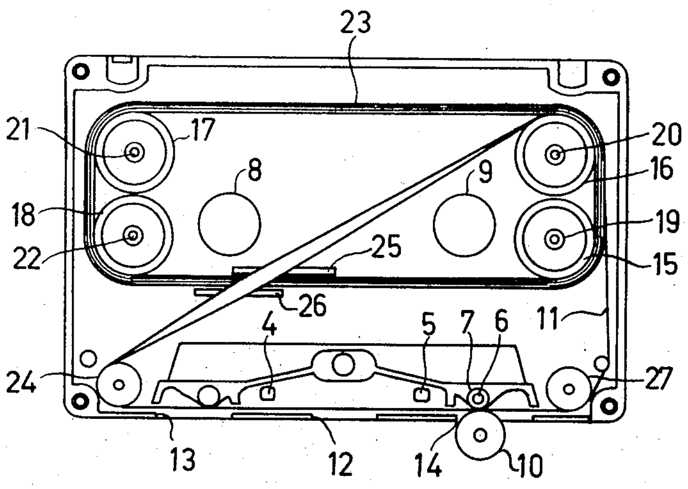
Figure 2:
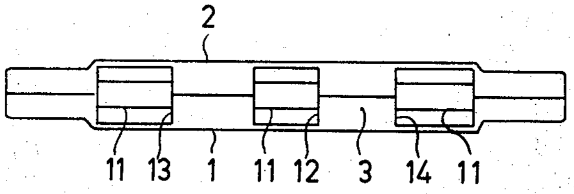

An embodiment of the invention will now be described, by way of example, with reference to the accompanying diagrammatic drawings, in which:

FIG. 1 is a top plan view of a cassette according to the invention with the cover removed, and FIG. 2 is a front elevation of the cassette of FIG 1.

The cassette shown is in the form of a rectangular flat box having a bottom 1, a cover 2 and side walls 3. The bottom 1 and the cover 2 are formed with openings 4 and 5 which are aligned in pairs and serve for the passage of two centering pins provided in a recording and-/or reproducing apparatus (not shown), with openings 8 and 9 for the passage of two winding spindles normally provided in such apparatus (not shown) and with an opening 7 into which a driving shaft 6 of the apparatus may extend.

One of the longer side walls of the cassette is formed with openings 12 and 13 through which magnetic heads can be introduced into the cassette so as to engage a recording tape 11, and with an opening 14 through which a pressure roller 10 can be introduced to urge the tape 11 to the driving shaft 6.

Four flangeless supporting rollers 15, 16, 17 and 18 are mounted for free rotation on studs 19, 20, 21 and 22 which are rigidly secured in the bottom 1 at the vertices of an imaginary rectangle. The recording tape is in the form of an endless coil 23 which is wound round the rollers 15, 16, 17 and 18 and has an elongate rectangular shape the longer and shorter sides of which are parallel to the longer and shorter sides respectively of the cassette. Thus, the space in the cassette is utilized with maximum efficiency, a maximum supply of tape being accommodated in the cassette with a comparatively small number of windings.

The tape is drawn from the interior of the coil 23 off the supporting roller 16 spaced from a first guide roller 24 by the greatest distance, so that the tape travels maximum distance along a diagonal of the cassette. During its travel along this diagonal path the tape is initially twisted through 90° so that its plane will be parallel to the cover 2, enabling the tape to travel past the windings of the coil 23, after which the tape is twisted through 90° in the opposite direction so as to reach the guide roller 24 in its original orientation. Two guide ribs 25 and 26 which project vertically from the bottom of the cassette serve to guide the tape in its horizontal position past the windings of the coil. From the guide roller 24 the tape moves past the openings 12 and 13 to a second guide roller 27, after which it is returned to the outer circumference of the coil 23.

What is claimed is:

1. A cassette having the shape of a flat box containing a tape for recording and playback of magnetic recordings comprising a bottom, a cover and side walls, a plurality of openings arranged in the bottom and in the cover, said openings aligned in pairs for receiving winding spindles and a driving shaft of a recording apparatus, a plurality of openings formed in one of the longer side walls past which the tape is conveyed and through which magnetic heads and a pressure roller of said recording apparatus can be passed for contact with the tape, a pair of guide rollers arranged at two of the corners within the cassette adjacent said side wall having the plurality of openings for guiding said tape along said side wall, four flangeless supporting rollers rotatably mounted within said cassette between said cover and said bottom, said rollers being mounted on studs secured in the bottom of the cassette for free rotational movement, said recording tape being wound about said four flangeless supporting rollers so as to form an endless coil in the shape of an elongate rectangle, the longer and shorter sides of said rectangularly shaped endless coil of tape being parallel to the longer and shorter sides respectively of the cassette, said tape being unwound from the interior of said rectangularly shaped endless coil in a diagonal path from one of said supporting rollers to one of said guide rollers, said tape being passed along said side wall having the plurality of openings between said guide rollers and thence is returned to the outer circumference of said endless coil, and guide rib means projecting vertically from the bottom of said cassette for guiding said tape in a horizontally oriented path so that the tape is twisted through 90° during its travel along said diagonal path so as to move past the windings of said coil in the twisted condition and is untwisted to return to a substantially vertical orientation with respect to the bottom of the cassette upon contact with said one of said guide rollers.

* * * * *

PO-1050
(5/69)

UNITED STATES PATENT OFFICE
CERTIFICATE OF CORRECTION

Patent No. 3,801,035 Dated April 2, 1974

Inventor(s) WILHELMUS FRANCISCUS ALOYSIUS HEYLANDS

It is certified that error appears in the above-identified patent and that said Letters Patent are hereby corrected as shown below:

In the heading:

After "[76] Inventor" insert

--[73] Assignee: U.S. Philips Corporation,
New York, N.Y.--

Signed and sealed this 17th day of September 1974

(SEAL)
Attest:

McCOY M. GIBSON JR.
Attesting Officer

C. MARSHALL DANN
Commissioner of Paten

PO-1050
(5/69)

UNITED STATES PATENT OFFICE
CERTIFICATE OF CORRECTION

Patent No. 3,801,035 Dated April 2, 1974

Inventor(s) Wilhelmus Franciscus Aloysius Heylands

It is certified that error appears in the above-identified patent and that said Letters Patent are hereby corrected as shown below:

In the heading:

Under Foreign Application Priority Data:

"44-79643" should be --79643/69--

Signed and sealed this 18th day of February 1975.

(SEAL)
Attest:

RUTH C. MASON
Attesting Officer

C. MARSHALL DANN
Commissioner of Patents
and Trademarks